United States Patent
Franchino

(10) Patent No.: US 9,806,598 B2
(45) Date of Patent: Oct. 31, 2017

(54) ACTIVE FILTERING SYSTEM

(71) Applicant: Schneider Electric Industries SAS, Rueil-Malmaison (FR)

(72) Inventor: Roger Franchino, Meylan (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/341,324

(22) Filed: Nov. 2, 2016

(65) Prior Publication Data

US 2017/0155314 A1 Jun. 1, 2017

(30) Foreign Application Priority Data

Dec. 1, 2015 (FR) ...................................... 15 61664

(51) Int. Cl.
  *H03J 3/18* (2006.01)
  *H02M 1/12* (2006.01)
  *H02M 7/217* (2006.01)
  *G05F 1/70* (2006.01)

(52) U.S. Cl.
  CPC ........... *H02M 1/126* (2013.01); *H02M 7/217* (2013.01)

(58) Field of Classification Search
  CPC . H02M 1/12; H02M 1/15; H02M 1/44; G05F 1/70; H02J 3/16; H02J 3/18; H02J 3/1821; H02J 3/1842
  See application file for complete search history.

(56) References Cited

U.S. PATENT DOCUMENTS

| 6,118,676 A * | 9/2000 | Divan ................... H02J 3/1814 323/207 |
| 6,982,546 B2 * | 1/2006 | Wu ......................... G05F 1/70 323/205 |
| 6,984,962 B2 * | 1/2006 | Angquist .............. H02J 3/1835 323/207 |

(Continued)

FOREIGN PATENT DOCUMENTS

DE 44 06 402 C1 4/1995

OTHER PUBLICATIONS

French Preliminary Search Report issued Aug. 31, 2016 in French Application 15 61664, dated Dec. 1, 2015 ( with English translation of categories of cited documents).

(Continued)

*Primary Examiner* — Gary L Laxton
(74) *Attorney, Agent, or Firm* — Oblon, McClelland, Maier & Neustadt, L.L.P.

(57) ABSTRACT

An active filtering system designed to be connected in parallel with an electric power supply network providing a main power supply current including a disturbing current, the system including at least one capacitor, a controlled current generator including an electric power supply intended to generate a positive determined voltage or a negative determined voltage and connected in series with the capacitor, a device for controlling the controlled current generator, designed to generate a compensation current to be applied to the main current in order to compensate the disturbing current while keeping a decoupling current measured at the connection point between the current generator and the capacitor at a value suitable for not saturating the current generator.

6 Claims, 2 Drawing Sheets

(56) References Cited

U.S. PATENT DOCUMENTS 7,173,349 B2 * 2/2007 Bijlenga ............... H02J 3/1842
307/98

OTHER PUBLICATIONS

V. Cascone et al. "Design of Active Filters for Dynamic Damping of Harmonic Currents Generated by Asynchronous Drives in Modern High Power Locomotives", Proceedings of the Annual Power Electronics Specialists Conference (PESC), 1992, 8 pages.

M. Carpita et al. "Line Filter for High Power Inverter Locomotive Using Active Circuit for Harmonic Reduction, Prototype Tests Results", EPE '95: 6$^{th}$ European Conference on Power Electronics and Applications, 1995, 6 pages.

M. El-Habrouk et al. "Active power filters: A Review", IEE Proceedings: Electric Power Applications, vol. 147, No. 5, 2000, 11 pages.

* cited by examiner

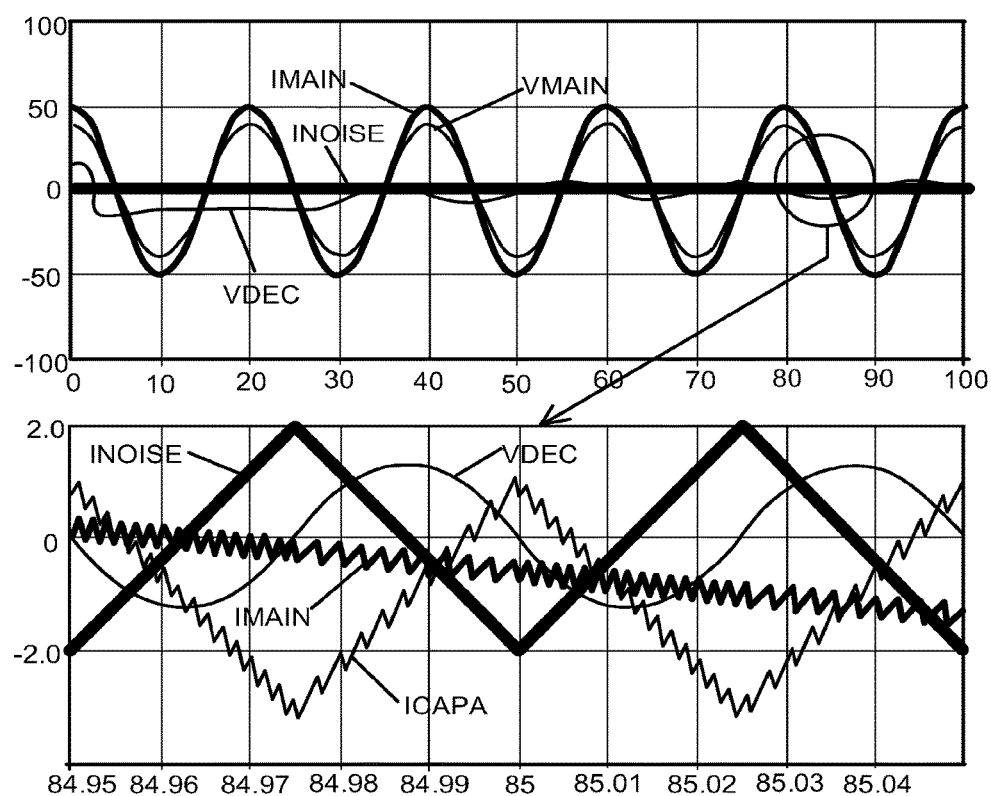

ACTIVE FILTERING SYSTEM

TECHNICAL FIELD OF THE INVENTION

The present invention relates to an active filtering system. The active filtering system according to the invention will be used in particular for filtering the current harmonics present in the frequency band ranging from 2 kHz to 150 kHz.

PRIOR ART

In the electrical energy supply sector it is known that certain electrical devices such as power converters, variable speed drives, electric motors, neon lighting units or low-consumption light bulbs, which are connected to the conventional 50/60 Hz electrical network, create current harmonics. These current harmonics are damaging for the electrical network itself, but also for the other electrical devices which are connected to the same electrical network. They also have a tendency to disturb the transmission of data using LCC (Line Carrier Current) technology. In effect the frequency band employed by LCC technology—ranging from 3 kHz to 148.5 kHz and used in particular in domotics—may be polluted by the presence of certain power converters, such as those which comprise an active rectifier stage and which return current onto the network. The disturbing current returned is generated in triangular from at a fundamental frequency ranging from a few kHz to a few tens of kHz. The known filtering systems are of the passive type and comprise one or more copper windings. These solutions are particularly bulky and are therefore difficult to implement.

The publication entitled "Design of active filters for dynamic damping of harmonic currents generated by asynchronous drives in modern high power locomotives"—Cascone V et Al—29Jun. 1992 XP000369055 describes an active filtering system.

The aim of the invention is to propose an active filtering system which is able to filter a disturbing current present in a frequency band ranging from 2 kHz to 150 kHz, the system being simple to implement, reliable, compact and low-cost.

SUMMARY OF THE INVENTION

This aim is achieved by an active filtering system designed to be connected in parallel with an electric power supply network providing a main power supply current including a disturbing current, the said system comprising:
at least one capacitor,
a controlled current generator comprising an electric power supply intended to generate a positive determined voltage or a negative determined voltage and connected in series with the capacitor,
a device for controlling the controlled current generator, designed to perform destination control of the current generator so that the latter generates a compensation current to be applied to the main current in order to compensate the said disturbing current,
The said control is provided by implementing:
a first current loop designed to filter the main current in order to obtain a first high-frequency current,
a second control loop designed to correct the said first high-frequency current with a second current which is proportional to a decoupling voltage measured at the connection point between the controlled current generator and the said capacitor,
an adder designed to determine a control parameter by means of the difference between the first current and the second current,
a hysteresis comparator designed to output the said control value to be applied based on the said control parameter which is input.

According to a particular feature, the control device is designed to keep the decoupling voltage at a value comprised between the said positive determined voltage and the said negative determined voltage.

Preferably, the control device is designed to keep the said decoupling voltage at a value close to 0 volts.

According to another particular feature, the current generator comprises a voltage converter comprising two switches and an inductance connected at a middle point situated between the two switches, the two switches being controlled in a complementary manner by the control device so as to apply a voltage to the said middle point equal to the said positive determined voltage or to the said negative determined voltage.

Preferably, the two switches are each composed of a fast-switching transistor at a frequency at least higher than 500 kHz.

According to another particular feature, the control device comprises a hysteresis comparator designed to output a control value to be applied to the voltage converter switches based on a control parameter which is input.

According to another particular feature, the control device comprises a filter designed to filter the main current in order to obtain a first high-frequency current.

According to another particular feature, the control device comprises means for determining a second current based on the said decoupling voltage.

According to another particular feature, the determination means are designed to apply a dummy impedance to the decoupling voltage in order to deduce the second current from it, the said dummy impedance being determined so as to eliminate the low-frequency component of the decoupling voltage.

According to another particular feature, the control device comprises an adder designed to determine the control parameter by means of the difference between the first current and the second current.

BRIEF DESCRIPTION OF THE FIGURES

Other characteristic features and advantages will become clear from the following detailed description provided with reference to the accompanying drawings in which:

FIG. 2 shows simulation graphs illustrating the operating principle of the active filtering system according to the invention.

DETAILED DESCRIPTION OF AT LEAST ONE EMBODIMENT

Figure 1:
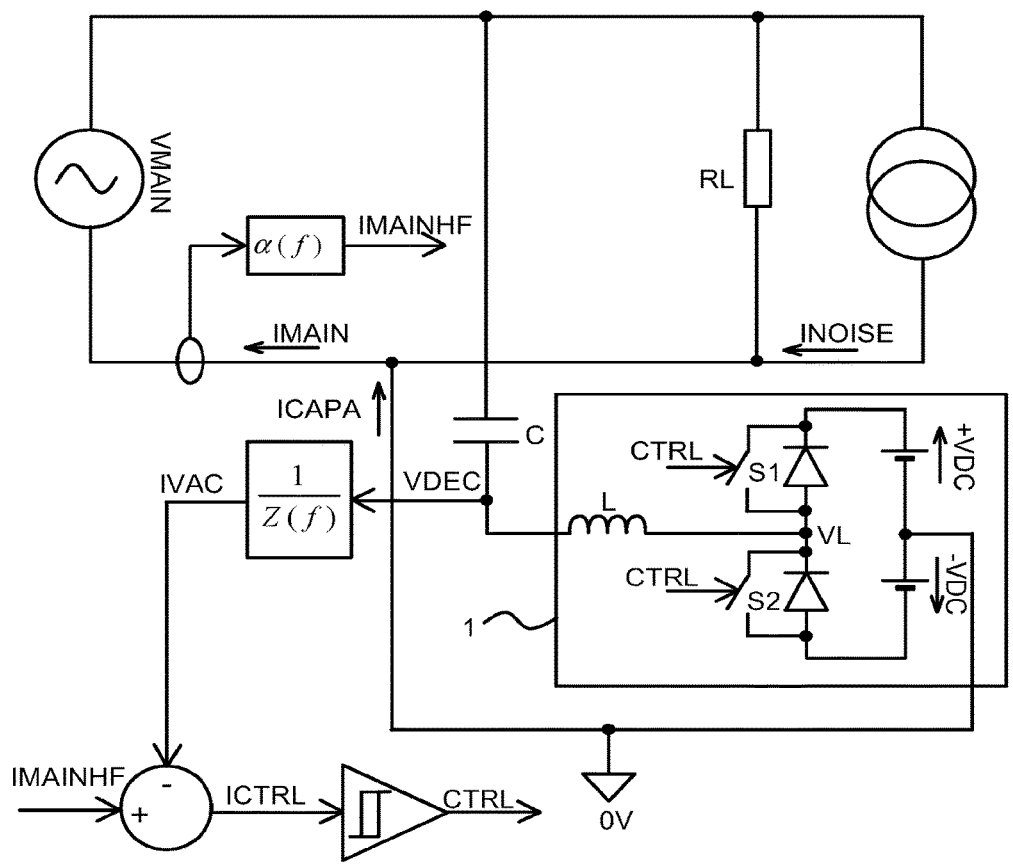
FIG. 1 shows the architecture of the active filtering system according to the invention and its control device implemented for an electric power supply network.

The invention concerns an active filtering system designed to be connected to an electric power supply network.

FIG. 1 shows in schematic form an electric power supply network providing between two power supply lines a voltage VMAIN applied to an electrical device generating a disturbing current on this network. This electrical device is schematically represented by a current generator and by a linear load RL connected in parallel and intended to draw the current at the fundamental frequency supplied by the network.

The active filtering system of the invention is intended to be connected in parallel on the two lines of the electric power supply network and be inserted between this network and the electrical device generating the disturbing current, indicated as INOISE.

The active filtering system according to the invention is controlled so as to generate a current ICAPA for compensating this disturbing current INOISE.

As shown in FIG. 1, the active filtering system according to the invention comprises a controlled current generator 1, a capacitor C connected on the one hand to the first power supply line of the network and on the other hand in series with the current generator 1 and a control device designed to control this current generator 1 in order to generate the compensation current ICAPA defined above.

The current generator 1 comprises a first terminal connected to the capacitor C and a second terminal connected to the second power supply line of the electrical network. Between its two terminals, the current generator 1 comprises:
- a voltage converter comprising two switches S1, S2 connected together by a middle connection point,
- An inductance L connected to the middle connection point and to the capacitor C of the filtering system,
- A bipolar, d.c., electric power supply able to provide two d.c. voltages, i.e. a positive voltage +VDC and a negative voltage −VDC, the middle point between the two voltages being connected to the second power supply line.

The control device may be realized partly or entirely with the aid of analog and/or digital components.

As described above, the control device uses two separate control loops in order to control the compensation current so that it follows the variations of the disturbing current.

The control device comprises a zero-centred hysteresis comparator for defining switching thresholds +ih and −ih based on a control parameter ICTRL input into the comparator and outputting the control value CTRL for the two switches of the voltage converter.

The two switches S1, S2 of the voltage converter are controlled in a complementary manner, namely when one of them is closed, the other one is open and vice versa.

The first switch S1 is thus positively controlled, i.e. it is in the closed state when the control value, indicated as CTRL, is higher than the threshold plus the hysteresis.

The second switch S2 is thus negatively controlled, namely it is in the closed state if the control value CTRL is lower than the threshold less the hysteresis.

In order to determine the control parameter ICTRL, the control device uses the two abovementioned control loops, the respective outputs of which are the currents IMAINHF and IVAC applied to an adder designed to determine a difference in current corresponding to the control parameter ICTRL, according to the relation:

ICTRL=IMAINHF−IVAC

Generally speaking, the first control loop is designed to control the disturbing current so as to leave only a low-amplitude high-frequency current on the network.

More precisely, the first control loop is intended to eliminate the low-frequency component of the current supplied by the network, i.e. the current component at 50 or 60 Hz (depending on the network frequency) and optionally the first low-frequency harmonics below 2 kHz. This first loop comprises a filter receiving at its input the current IMAIN measured by a sensor positioned on a line of the electrical network and outputting a filtered current IMAINHF retaining the component having a frequency higher than 2 kHz of the main current IMAIN.

The filter used is for example of the reject or high-pass type and has a gain indicated as $\alpha(f)$.

Generally speaking, the second control loop is designed to control the voltage at the connection point between the capacitor C and the current generator 1 so as to centre it on an average value which is zero at low frequency (i.e. below 2 kHz for the invention).

More precisely, the second control loop is intended to control the decoupling voltage VDEC measured at the connection point between the capacitor C and the current generator 1 so as to keep it at a value suitable for not saturating the current generator 1. This will consist for example in limiting this decoupling voltage VDEC to a value comprised between the two power supply voltages +VDC and −VDC and preferably reducing the decoupling voltage VDEC to a value close to 0 V. For this purpose, the second control loop applies a dummy impedance Z which is combined with the capacitance of the capacitor C and the filter of the first control loop so as to reduce the decoupling voltage VDEC to a value close to 0 V.

The decoupling is referred to as being "active" because the low-frequency current which crosses the capacitor C and is needed to keep the decoupling voltage VDEC at 0 V is supplied by the current generator itself. By correcting the current IMAINHF by a current proportional to the decoupling voltage VDEC $$\left(IVAC = \frac{VDEC}{Z(f)}\right),$$

the current IMAINHF is forced to follow on average $$\frac{VDEC}{Z(f)}$$

and therefore the main current IMAIN is forced to follow $$\frac{VDEC}{\alpha Z(f)}.$$

The current which crosses the capacitor C therefore corresponds to the same current which would be obtained by connecting the capacitor C to an impedance $\alpha Z(f)$ to form a high-pass passive filter C-αZ by deducting the current passing into the inductance L. By means of a careful choice of the impedance Z(f), the low-frequency component of VDEC is eliminated. This counter-reaction is such that the voltage VDEC is minimally affected by the input voltage VMAIN, this being achieved without adding any passive component and without creating an additional physical mesh by means of which a low-frequency current could be established with the power supply +/−VDC and make the assembly unstable.

In the second control loop, the second decoupling voltage VDEC is used to determine the current IVAC based on the following relation:

$$IVAC = \frac{VDEC}{Z(f)}$$

The current IMAINHF obtained at the output of the first control loop and the current IVAC obtained at the output of the second control loop are applied to an adder of the control loop in order to determine the difference in current ICTRL. As described above, this difference ICTRL defined above for generating the control value for the switches arises in fact from the difference between the current IMAINHF and the current IVAC in accordance with the following relation:

ICTRL=IMAINHF−IVAC

The operating principle of the invention is as follows:
When the difference ICTRL increases until it reaches the high threshold +ih of the comparator, the comparator outputs a switching command intended for the two switches. The voltage VL at the middle point between the two switches passes to +VDC.

The inductance L of the current generator then generates a variation in current which opposes the increase of the current ICTRL, thus resulting in a reduction of this current ICTRL.

When the difference ICTRL decreases until it reaches the low threshold −ih, the comparator outputs a switching command intended for the two switches. The voltage VL at the middle point between the two switches passes to −VDC.

The inductance L of the current generator then generates a variation in current which opposes the decrease in the current ICTRL, thus causing an increase of the current ICTRL, until it reaches again the high threshold +ih.

It can this be understood that the current ICTRL varies in accordance with a sawtooth profile with limit values −ih and +ih.

Preferably, the power supply of the current generator is chosen so as to provide voltages +VDC, −VDC with a low value, for example +15V and −15V, respectively, this allowing switches of the fast-switching transistor type to be used. With a power supply providing for example +15V and −15V voltages it is possible to choose transistors capable of switching at 500 kHz.

However, since the input voltage VMAIN supplied by the network is much higher than the voltage VDC provided by the power supply of the current generator, the voltage VDEC must be controlled by means of positioning of the second control loop described above. The second control loop is thus able to ensure that the voltage VDEC is affected minimally by the voltage VMAIN supplied by the network.

The second control loop is intended to prevent saturation of the current generator by keeping the voltage VDEC in the range −VDC to +VDC and preferably in the region of a value close to 0 V. In fact it must be able to allow control of the current difference ICTRL which has alternatively a positive slope and a negative slope.

By means of the second control loop it is possible to correct the current IMAINHF with the current IVAC which is proportional to the decoupling voltage VDEC and force the current IMAINHF to follow on average the expression $$\frac{VDEC}{Z(f)}$$

and therefore the current IMAIN to follow the 'expression $$\frac{VDEC}{\alpha Z(f)}.$$

FIG. 2 illustrates the operating principle of the invention. These simulation graphs were obtained based on the following input data:
  Voltage VMAIN=230V at a frequency of 50 Hz,
  A load drawing a current of 40 Aeff,
  A triangular disturbing current INOISE with frequency 20 kHz and amplitude 2A peak.
  It can also be seen from the graphs that:
  the decoupling voltage VDEC is only minimally disturbed;
  a component with frequency 50 Hz and amplitude 5V is created and has the effect of producing a dysymmetry in the sawtooth graph of the compensation current ICAPA;
  the two slopes of the graph for the ICAPA current remain sufficiently steep for the compensation current to follow easily the disturbing current INOISE at each instant.

It must be understood that the architecture of the filtering system according to the invention will depend on the current drawn by the load at the network frequency, the amplitude of the disturbing current generated by the load, the frequency and the slope of this disturbing current.

With the active filtering system according to the invention it is possible to obtain a residual current after filtering which contains only a high-frequency component, with a value much higher than that of the disturbing current. This vary high frequency current may be filtered by an additional system. In this way, the network may supply the load with a current at the normal frequency of 50 or 60 Hz.

The invention constitutes a technical solution which is able to solve the problem of disturbing currents present on the network in the frequency band ranging from 2 kHz to 150 kHz, something which the existing solutions are unable to achieve, said solutions being very often bulky since they are realized using copper windings.

Moreover, the solution according to the invention offers numerous advantages, including:
  a lower cost made possible by using low-voltage transistors;
  simple implementation using a simple control law.

The invention claimed is:
1. An active filtering system designed to be connected in parallel with an electric power supply network providing a main power supply current including a disturbing current, said system comprising:
  at least one capacitor;
  a controlled current generator comprising an electric power supply configured to generate a positive determined voltage or a negative determined voltage and being connected in series with at least one the capacitor; and
  a control device configured to determine a control value for said controlled current generator so that the controlled current generator generates a compensation current to be applied to the main power supply current in order to compensate the disturbing current, said control value being determined by implementing:
    a first current loop designed to filter the main power supply current in order to obtain a first high-frequency current, a second control loop designed to correct the first high-frequency current with a second current that is proportional to a decoupling voltage measured at a connection point between the controlled current generator and said at least one capacitor, an adder designed to determine a control parameter by means of a difference between the first high-frequency current and the second current, and a hysteresis comparator designed to output said control value to be applied based on said control parameter, which is input.

2. The filtering system according to claim 1, wherein the control device is further configured to keep the decoupling voltage at a value comprised between said positive determined voltage and said negative determined voltage.

3. The filtering system according to claim 2, wherein the control device is further configured to keep said decoupling voltage at a value of about 0 volts.

4. The system according to claim 1, wherein the controlled current generator further comprises a voltage converter comprising two switches and an inductance connected at a middle point situated between the two switches, the two switches being controlled in a complementary manner by the control device so as to apply a voltage to said middle point equal to said positive determined voltage or to said negative determined voltage.

5. The system according to claim 4, wherein the two switches are each composed of a fast-switching transistor configured to switch at a frequency greater than 500 kHz.

6. The system according to claim 1, wherein the control device comprises means for determining the second current, configured to apply a dummy impedance to the decoupling voltage in order to deduce therefrom the second current, said dummy impedance being determined so as to eliminate a low-frequency component of the decoupling voltage.

* * * * *